METHOD FOR PREPARING ALKALI METAL PHOSPHATE COMPOSITIONS

Original Filed May 6, 1964 3 Sheets-Sheet 1

INVENTORS.
ROBERT B. HUDSON
CHARLES C. SISLER
BY Richard H. Childress
ATTORNEY

METHOD FOR PREPARING ALKALI METAL PHOSPHATE COMPOSITIONS

Original Filed May 6. 1964 3 Sheets-Sheet 2

INVENTORS.
ROBERT B. HUDSON
CHARLES C. SISLER
BY
Richard W. Childress
ATTORNEY

METHOD FOR PREPARING ALKALI METAL PHOSPHATE COMPOSITIONS

Original Filed May 6, 1964 3 Sheets-Sheet 3

*INVENTORS.*
ROBERT B. HUDSON
CHARLES C. SISLER
BY
Richard L. Childress
ATTORNEY United States Patent Office 3,591,334
Patented July 6, 1971

1

3,591,334

METHOD FOR PREPARING ALKALI METAL PHOSPHATE COMPOSITIONS

Robert B. Hudson, St. Louis, and Charles C. Sisler, Des Peres, Mo., assignors to Monsanto Company, St. Louis, Mo.

Continuation of application Ser. No. 365,426, May 6, 1964. This application Jan. 9, 1969, Ser. No. 791,209
Int. Cl. C01b 25/30
U.S. Cl. 23—107 11 Claims

ABSTRACT OF THE DISCLOSURE

A method is described for preparing a chemical composition by the reaction of a plurality of reactants having molar ratios in the composition which are difficult to determine by controlled procedures by accurately proportioning at least one of the reactants into a plurality of predetermined fractions, reacting at least one of the fractions with another reactant to form an intermediate product under accurately controlled conditions and reacting the intermediate product with the remaining reactants.

Figure 1:
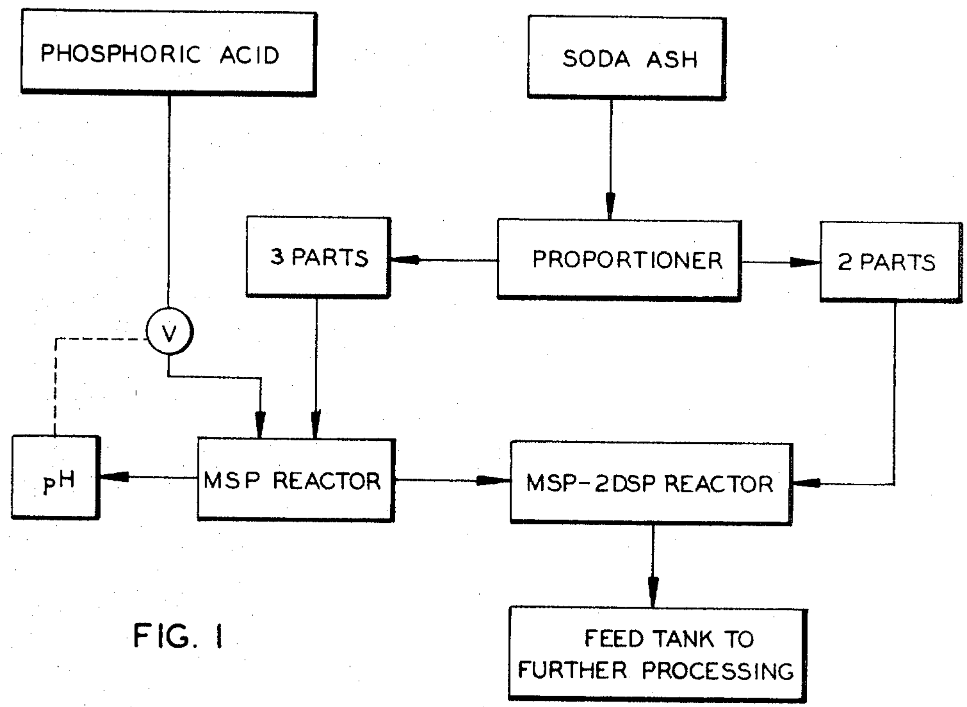

This application is a continuation of copending application Ser. No. 365,426 filed May 6, 1964 now abandoned.

This invention relates to a method for preparing chemical compositions and, more particularly, to a method for preparing chemical compositions, especially alkali metal phosphate compositions, having molar ratios of reactants which are difficult to determine by control procedures.

In the chemical industry there are prepared many chemical compositions having molar ratios of reactants which are difficult to determine by control procedures. An illustrative example of such a chemical composition is sodium tripolyphosphate. Although a large number of starting materials can be employed in preparing sodium tripolyphosphate, the starting material which has been used the most, both in the laboratory and in manufacturing procedures, has been a sodium phosphate precursor mixture having a molar ratio of disodium orthophosphate to monosodium orthophosphate of about 2:1. The molar ratio can be varied slightly and most manufacturers employ a slight excess of sodium ($Na_2O$) in their product to prevent the formation of turbidity in aqueous solutions of sodium tripolyphosphate due to small amounts of Maddrell's slats (Form II and III of $NaPO_3$) which are sometimes present as side-reaction products in sodium tripolyphosphate. Because there is no single physical measurement by means of which it is possible to determine the precise end point of a single stage neutralization to produce the desired precursor mixture, the usual method of determination is by chemical analysis which although comparatively simple is slow and cannot therefore be adapted easily to provide a continuous control. In addition, it is important that the precursor mixture be correctly proportioned because of the many possible side products, such as pyrophospsates and metaphosphates, which are possible in the preparation of sodium tripolyphosphate. As can be appreciated, therefore, a method for preparing a chemical composition whose molar ratios of reactants are difficult to determine by control procedures, as exemplified by such alkali metal phosphate compositions as sodium tripolyphosphate, in correct molar ratios by an easy, economical and simply controlled procedure would represent an advancement in this art.

Therefore, an object of the present invention is to provide an improved method for preparing chemical compositions.

2

Another object of the present invention is to provide an improved method for preparing chemical compositions having molar ratios of reactants which are difficult to determine by control procedures.

Another object of the present invention is to provide an improved method for preparing alkali metal phosphates and derivatives thereof having molar ratios of reactants which are difficult to determine by control procedures.

Another object of the present invention is to provide an improved method which can be controlled by a simple control step for preparing alkali metal phosphates and derivatives thereof having molar ratios which are difficult to determine by control procedures.

A still further object of the present invention is to provide an improved method for preparing an alkali metal phosphate precursor mixture suitable for further processing into alkali metal tripolyphosphate.

These as well as other objects of this invention, are accomplished by accurately proportioning at least one of the reactants into a plurality of predetermined fractions, reacting at least one of the fractions with another reactant to form an intermediate product under accurately controlled conditions, and reacting the intermediate product with the remaining reactants, all of which will be more fully discussed hereinafter.

Although this invention can be practiced using many and varied chemicals as reactants as will become more apparent from a reading of the description hereinafter, the invention will be illustrated and exemplified by using as reactants phosphate sources and alkali metal sources in preparing alkali metal phosphate compositions and derivatives thereof.

In general, any phosphate source can be used as long as it is capable of reacting with the alkali metal source to form the desired alkali metal phosphate composition. In particular, phosphate sources which are suitable are those which contain the phosphate anion and which include orthophosphoric acid, alkali metal orthophosphate salts, alkali metal pyrophosphate salts, condensed phosphoric acid, i.e., an acid containing polymers of orthophosphoric acid, phosphorus pentoxide as well as alkali metal phosphate streams, i.e., solutions or slurries, which have known compositions and which have an alkali metal to phosphorus molar ratio different than the alkali metal phosphate salts such as hemi-alkali metal phosphate streams and the like. The ortho- and condensed phosphoric acids suitable for use are preferably concentrated, i.e., containing less than about 50% water by weight, with the orthophosphoric acid containing from about 15 to 30% water by weight being especially preferred.

In general, any alkali metal source is suitable as long as it is capable of reacting with the phosphate source to form the desired alkali metal phosphate composition. It is preferred that the alkali metal source used be such as to provide only the alkali metal oxide in the desired proportion with the phoshporus pentoxide in the final phosphate product. In particular, such alkali metal sources which contain moieties capable of producing or forming gases during the reaction or being volatilized away during further processing steps in preparing the phosphate compositions are preferred. Such alkali metal sources include the basic inorganic salts, oxides and hydroxides, such as $Na_2CO_3$, NaOH, $Na_2O$, NaCl, $K_2CO_3$, KOH, $K_2O$, KCl, $Li_2CO_3$, and the like. Although the alkali metal sources of cesium and rubidium can, in some cases, be used in practicing this invention, since they are relatively expensive and are not readily available they are not the preferred materials for use as the alkali metal sources. In addition, other alkali metal sources which can be used include those materials which contain organic radicals such as oxalates, citrates, and the like, such as sodium oxalate, sodium citrate, and the like. Because the sodium and potassium phosphate compositions are, in general, the most widely used phosphate compositions and because such alkali metal sources as $Na_2CO_3$, NaOH, $K_2CO_3$ and KOH are relatively inexpensive as well as being readily available, they are preferred alkali metal sources for use in practicing the invention.

Since there are wide variations of phosphate sources and alkali metal sources which can be used in the process of the present invention, either the phosphate source or the alkali metal source can be the reactant which is proportioned into the plurality of predetermined streams and depending upon, inter alia, such conditions as the type of reactant proportioned and method for controlling the formation of the reaction product, any intermediate product can be formed having, in general, any molar ratio of alkali metal to phosphorus although it is preferred, because of the ease of controlling the intermediate product, that either a product having a molar ratio of alkali metal to phosphorus of about 1:1 or 2:1 (hereinafter termed mono-alkali metal phosphate and di-alkali metal phosphate, respectively) be formed under accurately controlled procedures.

Accurate control of the intermediate product which is formed under controlled precedures can be carried out by such means as colorimetry, turbidimetry, nephelometry, specific gravity measurement, conductance, viscosity, pH measurements and the like. Measurements of pH, especially electrometric pH determination, are preferred because the pH of a mono-alkali metal phosphate or dialkali metal phosphate solution is extremely sensitive to small changes in the alkali metal to phosphorus molar ratio and therefore such can be used to accurately determine the end point. Substantially dilute solutions, that is, from about 0.5% to about 25% concentration, are preferred because the more dilute solutions exhibit more sensitive pH changes and concentrations from about 1% to about 10% concentration are especially preferred. For example, a 1% solution at 25° C. having a sodium to phosphorus molar ratio of 0.99:1 has a pH of about 4.0 while a solution having a molar ratio of 1.01:1 has a pH of about 4.9.

Suitable mechanical means for accurately proportioning either the phosphate source or the alkali metal source into a plurality of predetermined fractions includes such arrangements as disclosed in the co-pending application of Robert B. Hudson entitled Apparatus and Method for Proportioning a Material, filed this same date and patented May 3, 1966 as U.S. Pat. 3,249,116.

As previously mentioned, the instant invention can be practiced using many and varied reactants to prepare many and varied chemical compositions and in order to more fully appreciate the versatility and selectivity of the present invention, illustrative examples will be given which include the preparation of an alkali metal phosphate precursor mixture suitable for further processing into alkali metal tripolyphosphate, an alkali metal precursor mixture suitable for preparing alkali metal metaphosphate glass compositions, a tri-alkali metal phosphate composition, a mixed alkali metal phophate precursor mixture for preparing a mixed alkali metal pyrophosphate composition and an alkali metal phosphate precursor mixture for preparing an alkali metal pyrophosphate composition.

The following is presented to illustrate the present invention in preparing an alkali metal phosphate precursor mixture suitable for further processing into an alkali metal tripolyphosphate. The alkali metal phosphate precursor mixture of the present invention, that is, a mixture having a molar ratio of dialkali metal orthophosphate to mono-alkali metal orthophosphate of about 2:1, can be further processed into alkali metal tripolyphosphate by various methods known in the art, such as, forming an intimate mixture of the mono-alkali metal and di-alkali metal phosphate suitable for calcining by means which include co-crystallization, drum drying, flash drying, and ball-milling or comminution of a mixture of the solids; followed by the calcination of such mixture at temperatures from above about 260° C. but below the melting point of the desired tripolyphosphate. It should also be noted that a melt of the precursor mixture can be formed, rapidly chilled to a glass and subsequently tempered to form the desired alkali metal tripolyphosphate.

Reference will now be made to the accompanying drawing, FIG. 1, which illustrates diagrammatically the operation and the various stages of the process according to one of the preferred forms of the invention in proportioning the sodium source (soda ash) in the preparation of a sodium phosphate precursor mixture suitable for further processing into sodium tripolyphosphate.

The reactions involved in the stages of the process using soda ash (sodium carbonate) and phosphoric acid as reactants are as follows:

Step 1: 3 parts by weight $Na_2CO_3$

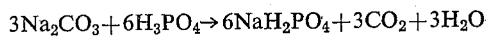

$$3Na_2CO_3+6H_3PO_4 \rightarrow 6NaH_2PO_4+3CO_2+3H_2O$$

Step 2: 2 parts by weight $Na_2CO_3$

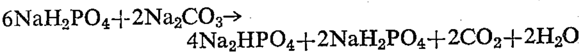

$$6NaH_2PO_4+2Na_2CO_3 \rightarrow 4Na_2HPO_4+2NaH_2PO_4+2CO_2+2H_2O$$

In carrying the invention into effect according to a preferred embodiment thereof as indicated in FIG. 1 of the drawing, soda ash is passed into a suitable proportioner where it is divided accurately into a weight ratio of about 3:2. The 3:2 ratio can be varied as desired since most commercial sodium tripolyphosphate is deliberately made with a slight excess of sodium ($Na_2O$) and therefore the precursor molar ratio is usually from about 2.05–2.15 moles of disodium phosphate per 1 mole of monosodium phosphate. The 3 parts soda ash are reacted, preferably under agitation, with phosphoric acid of about 75% $H_3PO_4$ by weight in the MSP reactor to form a monosodium orthophosphate solution as the intermediate product. The amount of phosphoric acid passed to the MSP reactor is controlled by an electrometric pH determination in order to achieve the desired degree of neutralization and form the monosodium orthophosphate solution. Conventional arrangements for controlling the phosphoric acid include a pH meter coupled with a pneumatically operated system or electrically operated system for actuating the valve located on the phosphoric acid feed line. The pH measurement is preferably made on a diluted (about 1% concentration) and cooled sample of the reactor contents and, depending upon measurement conditions, is usually about 4.5. This method of monitoring and controlling the MSP reactor is particularly accurate and effective since the pH of a dilute solution of monosodium orthophosphate is very sensitive to small changes in the ratio of sodium to phosphorus. The carbon dioxide gases and water vapor evolved during the neutralization are preferably exhausted from the MSP reactor. The monosodium orthophosphate liquor is then passed to a MSP–2DSP reactor and reacted, preferably under agitation, with the 2 parts soda ash to form the sodium phosphate precursor mixture having a molar ratio of disodium phosphate to monosodium phosphate of about 2:1. The reaction mixture in the MSP–2DSP reactor is preferably controlled to yield a substantially saturated solution, i.e., from about 50 to 60% concentration, in order to reduce the evaporative load in further processing steps. The sodium phosphate precursor mixture can be further processed by conventional means into sodium tripolyphosphate as is illustrated in the drawing by passing the precursor mixture to a feed tank for further processing.

Reference will now be made to the accompanying drawing, FIG. 2, which illustrates diagrammatically the operation and the various stages of the process according to another preferred form of the invention in proportioning the phosphate source (phosphoric acid) in the preparation of a sodium phosphate precursor mixture suitable for further processing into sodium tripolyphosphate.

The reactions involved in the stages of the process using caustic soda (sodium hydroxide) and phosphoric acid as the reactants are as follows:

Step 1: 5 parts by volume $H_3PO_4$ $$5H_3PO_4+10NaOH \rightarrow 5Na_2HPO_4+10H_2O$$

Step 2: 1 part by volume $H_3PO_4$ $$1H_3PO_4+5Na_2HPO_4 \rightarrow 2NaH_2PO_4+4Na_2HPO_4$$

Figure 2:
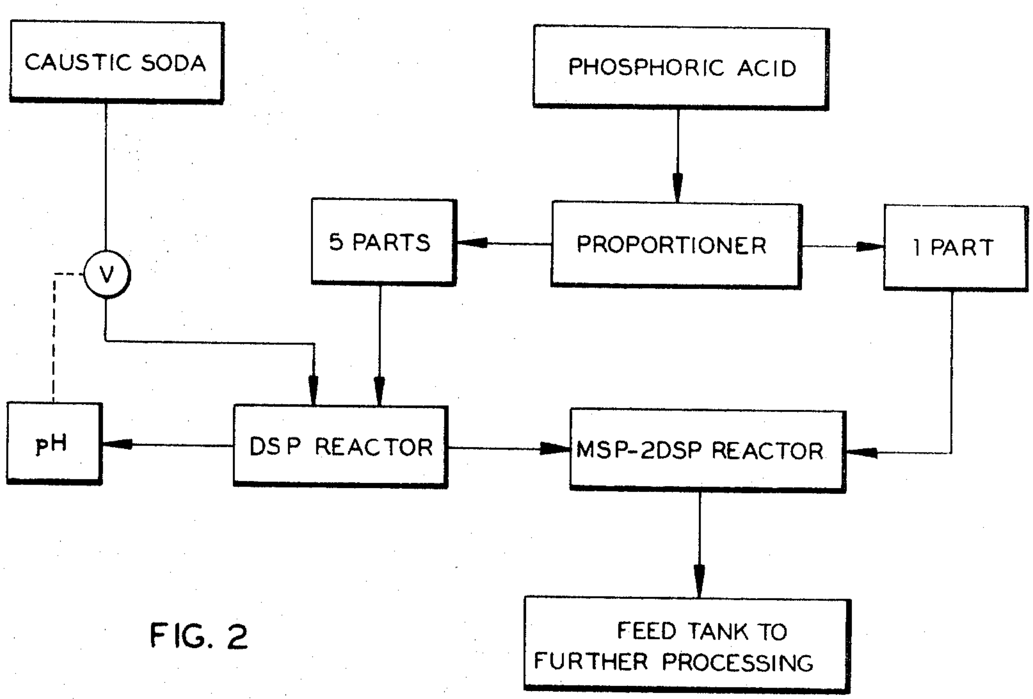

In carrying the invention into effect according to a preferred embodiment thereof as indicated in FIG. 2 of the drawing orthophosphoric acid of about 75% by weight $H_3PO_4$ is passed into a suitable proportioner where it is divided accurately into a volume ratio of about 5:1. The 5 parts orthophosphoric acid are reacted, preferably under agitation, with sodium hydroxide in the DSP reactor to form a disodium orthophosphate solution as the intermediate product. The amount of sodium hydroxide charged to the DSP reactor is controlled by an electrometric pH determination in order to achieve the desired degree of neutralization and form the disodium orthophosphate solution. The pH measurement is preferably made on a dilute and cooled sample of the reactor contents and, depending upon measurement conditions, is usually about 9.0. This method of monitoring and controlling the DSP reactor is particularly accurate and effective since the pH of a dilute solution of disodium orthophosphate is very sensitive to small changes in the ratio of sodium to phosphorus. The disodium orthophosphate liquor is then passed to a MSP–2DSP reactor and reacted, preferably under agitation, with the 1 part orthophosphoric acid to form the sodium phosphate precursor mixture having a molar ratio of disodium phosphate to monosodium phosphate of about 2:1. The reaction mixture in the MSP–2DSP reactor is preferably controlled to yield a substantially saturated solution, i.e., from about 50 to 60% concentration, in order to reduce the evaporation load in further processing steps. The sodium phosphate precursor mixture can be further processed by conventional means into sodium tripolyphosphate as illustrated in the drawing by passing the precursor mixture to a feed tank for further processing.

It should be noted that the foregoing preferred embodiments can be modified somewhat, if desired, by utilizing one reactor rather than two reactors to prepare the sodium phosphate precursor mixture. For example, in FIG. 1 the 3 parts soda ash can be reacted batchwise with phosphoric acid in a suitable reactor to form the monosodium phosphate and to this monosodium phosphate in the same reactor can be added subsequently the 2 parts soda ash to react with the monosodium phosphate to form the desired amount of the disodium phosphate.

In addition, the sodium phosphate precursor mixture can also be prepared in slurry form such as a slurry of from about 70 to 80% solids content by weight, although, in general, the sodium phosphate precursor mixture in solution is preferred because it yields a higher assay sodium tripolyphosphate when further processed by conventional methods.

The reactions, although preferably carried out in an aqueous medium in order to form an aqueous solution or slurry of the sodium phosphate precursor mixture, can be conducted, in some cases, if desired, under conditions which permit a relatively dry sodium phosphate precursor mixture to be formed. For example, in FIG. 2 disodium phosphate can be prepared in the DSP reactor in an amount of aqueous solvent which when further reacted with the 1 part phosphoric acid in the MSP–2DSP reactor will give, because of the exothermic reaction and/or temperature conditions used for the reaction, a relatively dry sodium phosphate precursor mixture.

The following examples are presented to illustrate the invention, with parts by weight being used in the examples unless otherwise indicated.

EXAMPLE 1

About 360 parts of commercial soda ash was subdivided into two parts having a weight ratio of about 3:2, i.e., about 216 parts and about 144 parts. The 216 part portion was reacted with orthophosphoric acid (85% $H_3PO_4$), in a suitable reaction vessel to form a monosodium phosphate solution. The amount of phosphoric acid reacted was controlled by pH determination, that is, the amount necessary for a 1% solution of the reaction product to have a pH of 4.60. Sufficient water was used to keep the monosodium phosphate in solution at a concentration of about 55%. The 144 part portion was then reacted with the monosodium phosphate solution in the same reaction vessel to produce a precursor mixture having a molar ratio of disodium phosphate to monosodium phosphate of about 2:1. This precursor mixture was then dried to remove the free water and calcined at about 450° C. for about 2 hours to yield sodium tripolyphosphate in over an 85% assay.

EXAMPLE 2

About 300 parts by volume of 85% orthophosphoric acid was sub-divided into two parts having a volume ratio of about 5:1, i.e., about 250 parts by volume and about 50 parts by volume. The 250 parts by volume was reacted with sufficient sodium hydroxide (50% aqueous solution) in a suitable reaction vessel to form disodium phosphate). The amount of sodium hydroxide reacted was controlled by pH determination, that is, the amount necessary for a 1% solution of the reaction product to have a pH of 9.0. Sufficient water was added to keep the material in solution, that is, a disodium phosphate solution concentration of about 45%. The 50 parts by volume was then reacted with the disodium phosphate solution in the same reaction vessel to produce a precursor mixture having a molar ratio of disodium phosphate to monosodium phosphate of about 2:1. This precursor mixture was then dried to remove the free water and calcined at about 450° C. for about 2 hours to yield sodium tripolyphosphate in over an 85% assay.

It should be noted that potassium tripolyphosphate can be prepared by potassium phosphate precursor mixtures prepared by substantially the same methods as utilized in the foregoing described examples when potassium sources are used as the alkali metal sources although the exact pH measurement used for control purposes will usually vary slightly from that of the sodium phosphates but such can be readily determined.

Figure 3:
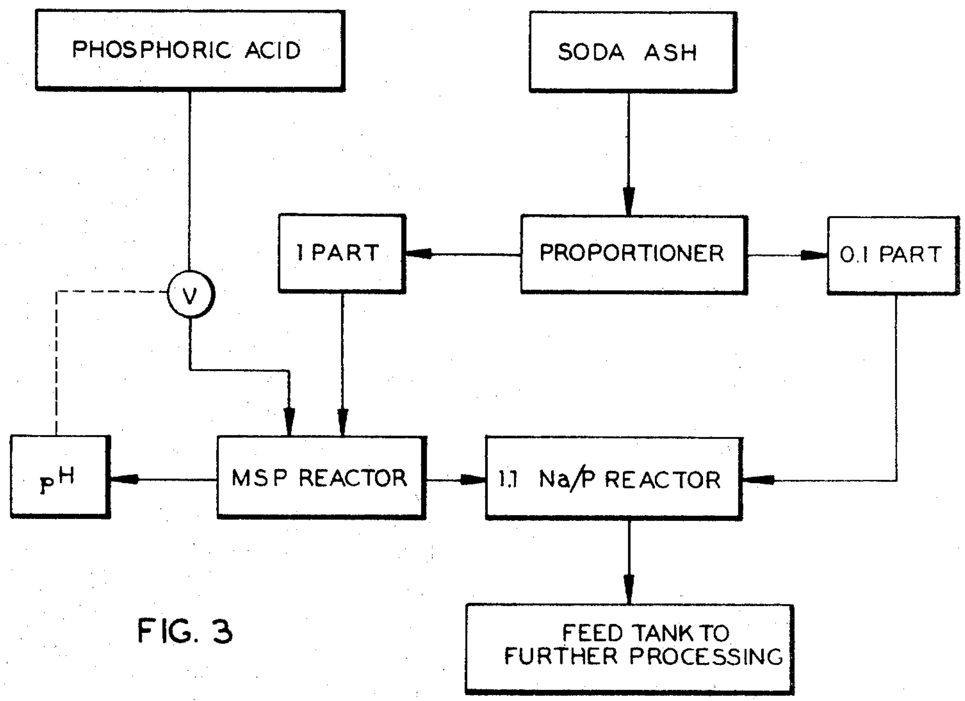

In order to illustrate the present invention in preparing an alkali metal phosphate precursor mixture suitable for further processing into an alkali metal metaphosphate composition, the following is presented and reference is made to the accompanying drawing, FIG. 3, which illustrates diagrammatically the operation and the various stages of the process according to one of the preferred forms of the invention in proportioning the sodium source (soda ash) in the preparation of a sodium phosphate precursor mixture.

The reactions involved in the stages of the process using soda ash (sodium carbonate) and phosphoric acid as reactants are as follows:

Step 2: 0.10 part by weight $Na_2CO_3$ $$1Na_2CO_3+2H_3PO_4 \rightarrow 2NaH_2PO_4+H_2O+CO_2$$

Step 2:0.10 part by weight $Na_2CO_3$ $$0.10\ Na_2CO_3 + 2NaH_2PO_4 \xrightarrow{\Delta} \text{melt} + H_2O + CO_2 \xrightarrow{\text{chill}} \underset{(1.1\ Na/P\ \text{ratio})}{\text{metaphosphate glass}}$$

In carrying the invention into effect according to a preferred embodiment thereof as indicated in FIG. 3 of the drawing, soda ash is passed into a suitable proportioner where it is divided accurately into a weight ratio of about 1:0.10. The one part soda ash is reacted, preferably under agitation, with phosphoric acid of about 75% $H_3PO_4$ by weight in the MSP reactor to form a monosodium orthophosphate solution as the intermediate product. The amount of phosphoric acid passed to the MSP reactor is controlled by an electrometric pH determination in order to achieve the desired accurate degree of neutralization and form the monosodium orthophosphate solution in like manner as mentioned hereinbefore. The monosodium orthophosphate liquor is then passed to a 1.1 Na/P reactor and reacted, preferably under agitation, with the 0.1 part soda ash to form the mixture suitable for further processing into a sodium metaphosphate glass composition. The reaction mixture in the 1.1 Na/P reactor is preferably controlled to yield a substantially saturated solution in order to reduce the evaporative load in further processing steps. This mixture can be further processed into a sodium metaphosphate glass composition by conventional means which essentially entails heating the mixture to form a melt and allowing the melt to cool under controlled conditions.

Figure 4:
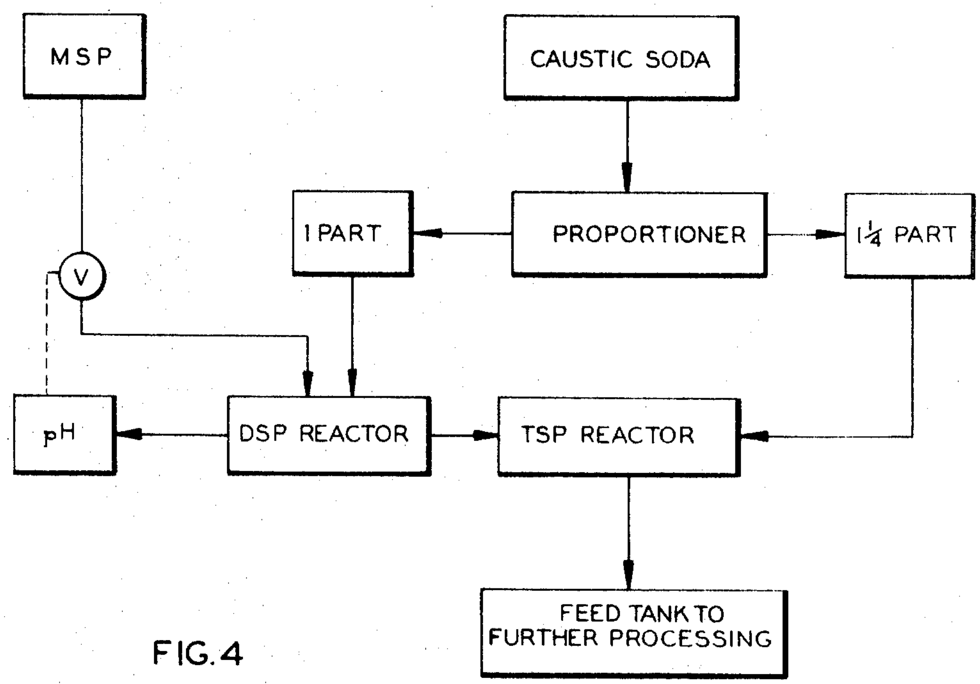

In order to illustrate the present invention in preparing a tri-alkali metal phosphate composition, the following is presented and reference is made to the accompanying drawing, FIG. 4, which illustrates diagrammatically the operation and the various stages of the process according to one of the preferred forms of the invention in proportioning the sodium source (caustic soda) in the preparation of trisodium phosphate.

The reactions involved in the stages of the process using caustic soda (sodium hydroxide) and monosodium orthophosphate as the reactant are as follows:

Step 1: 1 part by weight sodium hydroxide $$NaOH+NaH_2PO_4 \rightarrow Na_2HPO_4+H_2O$$

Step 2: 1¼ part by weight sodium hydroxide $$1\tfrac{1}{4}NaOH+Na_2HPO_4 \rightarrow Na_3PO_4+\tfrac{1}{4}NaOH+H_2O \rightarrow Na_3PO_4\text{-}\tfrac{1}{4}NaOH \cdot 12H_2O$$

In carrying the invention into effect according to a preferred embodiment thereof as indicated in FIG. 4 of the drawing, caustic soda is passed into a suitable proportioner where it is divided accurately into a weight ratio of 1:1.25. The one part of caustic soda is reacted, preferably under agitation, with a monosodium orthophosphate solution of about 50% concentration in the DSP reactor to form a disodium orthophosphate solution as the intermediate product. The amount of monosodium orthophosphate passed to the DSP reactor is controlled by an electrometric pH determination in order to achieve the desired accurate degree of neutralization and form the disodium orthophosphate solution in like manner as mentioned hereinbefore. The disodium orthophosphate liquor is then passed to a TSP reactor and reacted, preferably under agitation, with the 1.25 parts caustic soda to form a trisodium orthophosphate-¼ sodium hydroxide solution. The reaction mixture in the TSP reactor is preferably controlled to yield a substantially saturated solution in order to reduce the evaporation load in further processing steps. This solution is further processed by conventional crystallization means as is well known in the art to produce $Na_3PO_4\text{-}\tfrac{1}{4}NaOH \cdot 12H_2O$ crystals.

Figure 5:
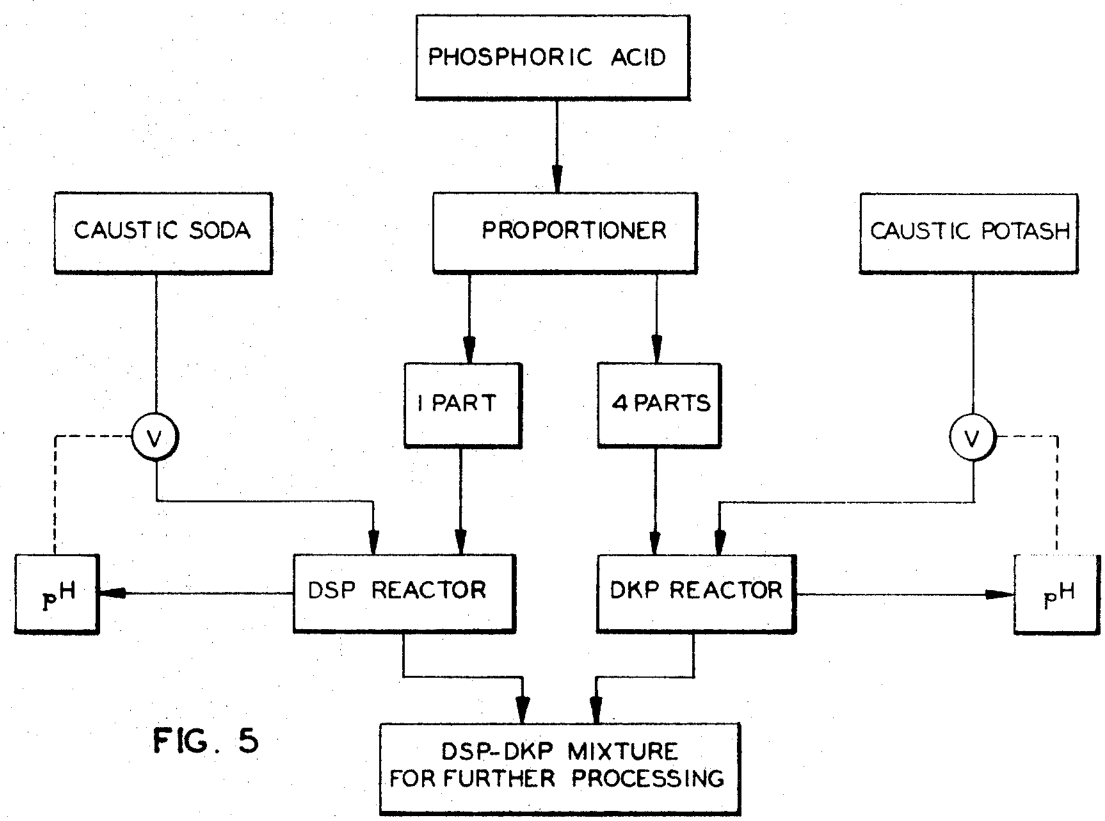

In order to illustrate the present invention in preparing a mixed alkali metal phosphate percursor mixture suitable for further processing into a mixed alkali metal pyrophosphate composition, the following is presented and reference is made to the accompanying drawing, FIG. 5, which illustrates diagrammatically the operation and the various stages of the process according to one of the preferred forms of the invention in proportioning the phosphate source (phosphoric acid) in the preparation of the mixed alkali metal phosphate precursor mixture.

The reactions involved in the stages of the process using caustic soda (sodium hydroxide) and caustic potash (potassium hydroxide) and phosphoric acid as reactants are as follows:

Step 1: 4 parts by weight $H_3PO_4$ $$8KOH+4H_3PO_4 \rightarrow 4K_2HPO_4+8H_2O$$

1 part by weight $H_3PO_4$ $$2NaOH+H_3PO_4 \rightarrow Na_2HPO_4+2H_2O$$

Step 2:

$$4K_2HPO_4+Na_2HPO_4 \rightarrow 4K_2HPO_4{:}1Na_2HPO_4 \text{ (mixture)}$$

In carrying the invention into effect according to a preferred embodiment thereof as indicated in FIG. 5 of the drawing orthophosphoric acid of about 75% by weight $H_3PO_4$ is passed into a suitable proportioner where it is divided accurately into a volume ratio of about 4:1. The 4 parts orthophosphoric acid are reacted, preferably under agitation, with potassium hydroxide in the DKP reactor to form a dipotassium orthophosphate solution as an intermediate product. The amount of potassium hydroxide charged to the DKP reactor is controlled by an electrometric pH determination in order to achieve the desired accurate degree of neutralization and to form the dipotassium phosphate solution in like manner as mentioned hereinbefore. In substantially the same manner, the 1 part orthophosphoric is reacted with sodium hydroxide to form a disodium phosphate solution as an intermediate product. The dipotassium phosphate solution and disodium phosphate solution are then combined into a precursor mixture having a molar ratio of potassium to sodium of about 4:1. This precursor mixture can be further processed by conventional means in order to prepare a mixed sodium potassium pyrophosphate which includes drying such as drum drying the solution and calcining the product at temperatures from about 350° C. to about 550° C.

Figure 6:
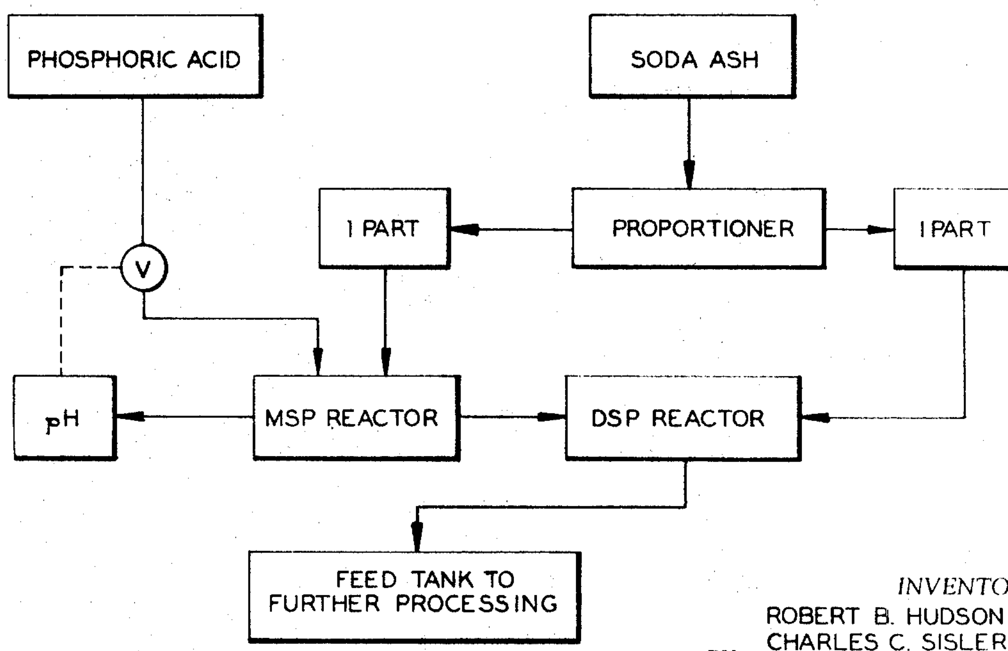

In order to illustrate the present invention in preparing an alkali metal phosphate precursor mixture suitable for further processing into an alkali metal pyrophosphate composition, the following is presented and reference is made to the accompanying drawing, FIG. 6, which illustrates diagrammatically the operation and the various stages of the process according to one of the preferred forms of the invention in proportioning the sodium source (soda ash) in the preparation of the alkali metal phosphate precursor mixture. This method is a distinct advantage in preparing the alkali metal pyrophosphate since an economical alkali metal source such as sodium carbonate can be used as the sole alkali metal reactant. In conventional processes, the sodium carbonate-orthophosphoric acid neutralization to disodium orthophosphate cannot be accurately controlled to the desired disodium orthophosphate end point since sodium carbonate is not capable of neutralizing the phosphoric acid to the desired pH end point of about 9.0. In usual cases, sodium hydroxide must be used to some extent in reaching the desired pH end point for process control. The method of the present invention, however, permits the use of sodium carbonate as the sole reactant by the accurate proportioning of the sodium carbonate, controlling the process by use of the monosodium orthophosphate end point and then forming the disodium orthophosphate solution.

The reactions involved in the stages of the process using soda ash (sodium carbonate) and phosphoric acid as reactants are as follows:

Step 1: 1 part by weight $Na_2CO_3$ $$Na_2CO_3+2H_3PO_4 \rightarrow 2NaH_2PO_4+H_2O+CO_2$$

Step 2: 1 part by weight $Na_2CO_3$ $$Na_2CO_3+2NaH_2PO_4 \rightarrow 2Na_2HPO_4+H_2O+CO_2$$

In carrying the invention into effect according to a preferred embodiment thereof as indicated in FIG. 6 of the drawing, soda ash is passed into a suitable proportioner where it is divided accurately into a weight ratio of 1:1. The 1 part soda ash is reacted, preferably under agitation, with phosphoric of about 75% $H_3PO_4$ by weight in the MSP reactor to form a monosodium orthophosphate solution as the intermediate product. The amount of phosphoric acid passed to the MSP reactor is controlled by an electrometric pH determination in order to achieve the desired accurate degree of neutralization and form the monosodium orthophosphate solution in like manner as mentioned hereinbefore. The monosodium orthophosphate solution is then passed to a DSP reactor where it is reacted with the remaining 1 part soda ash to form the desired disodium orthophosphate precursor mixture. The precursor mixture can be further processed by conventional means such as calcining to any temperatures from about 300° C. to about 900° C. in order to prepare sodium tripolyphosphate.

It should be noted that the foregoing methods can be modified somewhat, if desired, by utilizing one reactor rather than two reactors. For example, in FIG. 4, the one part caustic soda can be reacted with monosodium orthophosphate in a suitable reactor to form the disodium phosphate solution. To this solution can be added a 1.25 parts caustic soda to form the desired $Na_3PO_4 \cdot \frac{1}{4}NaOH$ solution.

It can, of course, be appreciated that the instant invention is quite versatile and highly selective since many different and various combinations of many different and various reactants can be used and the process can be carried out in either batch-wise or continuous operation. For example, the material source which is subdivided or proportioned can be a batch source or the material source can be a regulated feed stream which is fed at a rate which can furnish a desired mixture in a continuous operation.

The above described process offers many advantages over the conventional methods for preparing alkali metal phosphate compositions having molar ratios of reactants which are difficult to determine which include the capability of conducting the process in a batch-wise manner or by continuous operation as desired, ability to accurately control the molar ratio of the desired alkali metal phosphate composition which is important in order to minimize undesirable side products, as well as, permitting the process to be under a single simple control, for example, the preparation of either mono-sodium phosphate or disodium phosphate, which control can be carried out by utilizing the highly accurate pH readings of the monosodium or di-sodium phosphate solution.

What is claimed is:

1. A method for preparing an alkali metal tripolyphosphate precursor mixture having a molar ratio of dialkali metal phosphate to monoalkali metal phosphate of about 2:1 by the reaction of an alkali metal source selected from the class consisting of alkali metal carbonates and alkali metal hydroxides, with orthophosphoric acid which comprises proportioning said alkali metal source into two fractions having a weight ratio of about 3:2 parts, reacting said three parts with said phosphoric acid to form an intermediate phosphate product and reacting said product with the said two parts to form said precursor mixture.

2. The method of claim 1, wherein said alkali metal source is sodium carbonate and said alkali metal tripolyphosphate is sodium tripolyphosphate.

3. The method of claim 1, wherein said alkali metal source is potassium carbonate and said alkali metal tripolyphosphate is potassium tripolyphosphate.

4. Method for preparing an alkali metal tripolyphosphate precursor mixture having a molar ratio of dialkali metal phosphate to monoalkali metal phosphate of about 2:1 by the reaction of an alkali metal hydroxide with orthophosphoric acid which comprises proportioning said orthophosphoric acid into two fractions having a volume ratio of about 5:1 parts, reacting said five parts with said alkali metal hydroxide to form an intermediate phosphate product and reacting said product with the said one part to form said precursor mixture.

5. The method of claim 4, wherein said alkali metal hydroxide is sodium hydroxide and said alkali metal tripolyphosphate is sodium tripolyphosphate.

6. The method of claim 4, wherein said alkali metal hydroxide is potassium hydroxide and said alkali metal tripolyphosphate is potassium tripolyphosphate.

7. A method for preparing an alkali metal metaphosphate precursor mixture having a molar ratio of alkali metal to phosphorus of about 1.1:1 by the reaction of orthophosphoric acid and an alkali metal source selected from the class consisting of alkali metal metal carbonates and alkali metal hydroxides which comprises accurately proportioning the alkali metal source into a weight ratio of about 1:0.10 part, reacting said 1 part with the phosphoric acid to form a mono-alkali metal phosphate intermediate product controlled by electrometric pH determination, and reacting said product with said 0.10 part to form said precursor mixture.

8. The method of claim 7, wherein said alkali metal source is sodium carbonate and said alkali metal metaphosphate is sodium metaphosphate.

9. A method for preparing crystalline trisodium phosphate ¼ sodium hydroxide dodecahydrate by the reaction of monosodium phosphate and sodium hydroxide which comprises accurately proportioning the sodium hydroxide into a weight ratio of about 1:1.25 parts, reacting said one part with said mono-sodium phosphate to form a disodium phosphate intermediate product controlled by electrometric pH determination, reacting said product with said 1.25 parts to form a tri-sodium phosphate solution, and recovering said tri-sodium phosphate ¼ sodium hydroxide dodecahydrate crystals from said solution.

10. A method for preparing an alkali metal pyrophosphate precursor mixture by the reaction of orthophosphoric acid and an alkali metal carbonate which comprises accurately proportioning the alkali metal carbonate into a weight ratio of about 1:1 part, reacting said 1 part with the phosphoric acid to form a mono-sodium phosphate intermediate product controlled by electrometric pH determination, and reacting said product with the remaining 1 part to form said precursor mixture.

11. The method of claim 10, wherein said alkali metal carbonate is sodium carbonate and said alkali metal pyrophosphate is sodium pyrophosphate.

References Cited

UNITED STATES PATENTS

| | | | |
|---|---|---|---|
| 1,628,792 | 5/1927 | Larison et al. | 23—107 |
| 2,050,249 | 8/1936 | Alder | 23—107 |
| 2,747,964 | 5/1956 | Bacon et al. | 23—107 |

FOREIGN PATENTS

| | | | |
|---|---|---|---|
| 448,105 | 4/1948 | Canada | 23—107 |
| 562,992 | 9/1958 | Canada | 23—107 |

OTHER REFERENCES

Van Wazer: "Phosphorus and Its Compounds," vol. 1, p. 46, Ed. Interscience, New York, N.Y., 1958.

OSCAR R. VERTIZ, Primary Examiner

H. S. MILLER, Assistant Examiner

PO-1050
(5/69)

UNITED STATES PATENT OFFICE
CERTIFICATE OF CORRECTION

Patent No. 3,591,334 Dated July 6, 1971

Inventor(s) Robert B. Hudson and Charles C. Sisler

It is certified that error appears in the above-identified patent and that said Letters Patent are hereby corrected as shown below:

In column 6, line 65, the sentence beginning "Step 2: 0.10 part" should read---Step 1: 1 part---.

In column 9, claim 4, line 66, the word "A" should be inserted at the beginning of the claim.

Signed and sealed this 5th day of September 1972.

(SEAL)
Attest:

EDWARD M.FLETCHER,JR.
Attesting Officer

ROBERT GOTTSCHALK
Commissioner of Patents